Aug. 20, 1957   D. E. GRISWOLD   2,803,264
RATE OF FLOW CONTROL MEANS
Filed Oct. 27, 1952
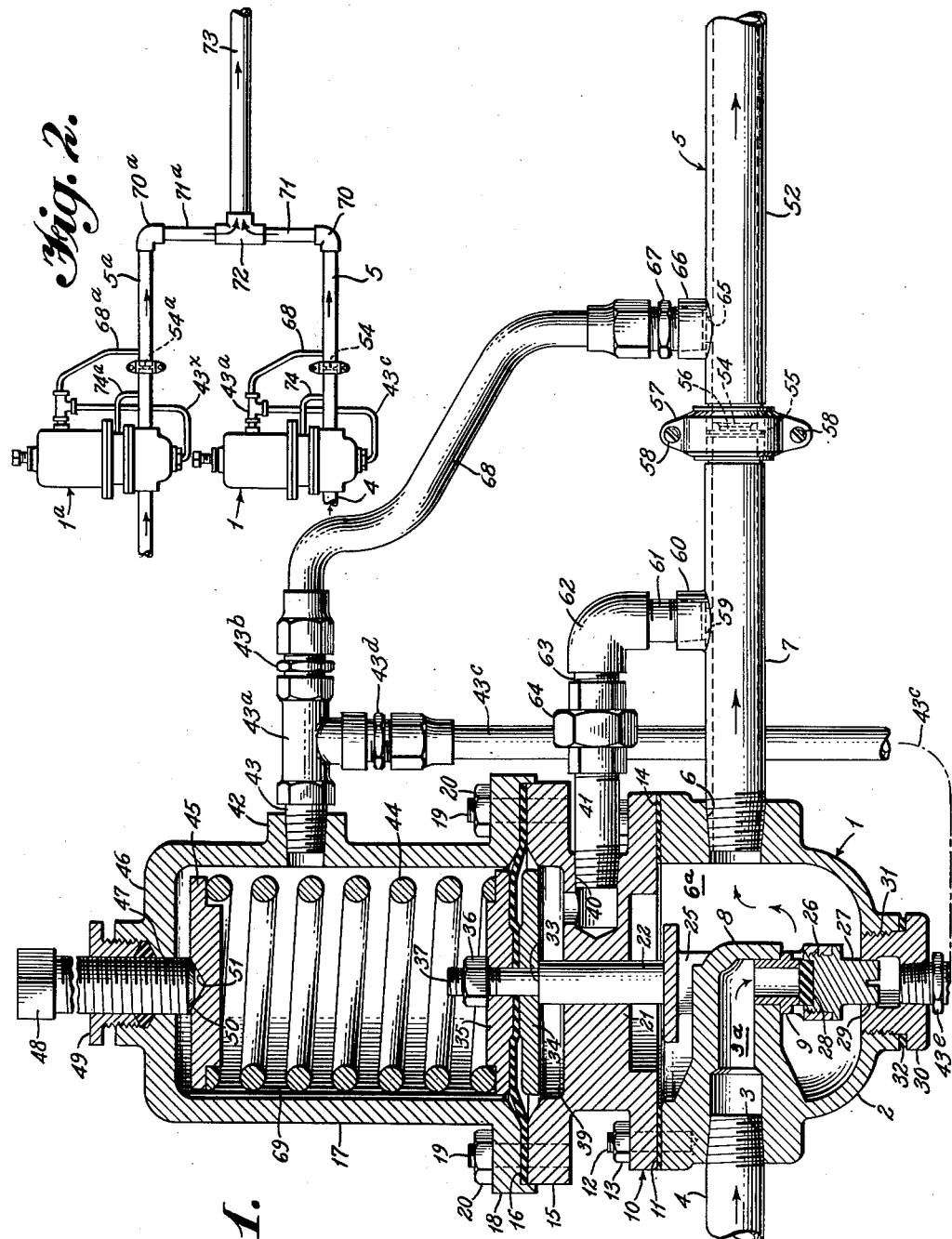
INVENTOR.
David E. Griswold
BY
ATTORNEYS

United States Patent Office 2,803,264
Patented Aug. 20, 1957

2,803,264

RATE OF FLOW CONTROL MEANS

David E. Griswold, San Marino, Calif., assignor to Donald G. Griswold, Alhambra, Calif.

Application October 27, 1952, Serial No. 316,972

5 Claims. (Cl. 137—501)

The present invention relates to liquid flow control means and more particularly to an automatic pressure responsive valve for maintaining a predetermined rate of flow through a pipeline.

The invention further relates to the use of two or more of such valves connected in parallel as a simple form of liquid proportioning apparatus.

The principal object of the invention is to provide an automatic pressure-responsive flow control valve for maintaining a substantially uniform rate of flow in a pipeline.

Another object of the invention is to provide automatic flow rate control means which is sensitive to pressure differentials taken at different points along a pipeline, for example, on opposite sides of a flow-restricting orifice.

A further and more specific object of the invention is to provide an automatic flow rate control valve adapted to be connected in parallel with one or more similar valves so that they will function to maintain independent flow rates, whereby two liquids can be supplied in predetermined proportionate ratio by combining the discharge from two or more valves.

Other objects and features of the invention will be apparent from the following description taken in conjunction wtih the accompanying drawings, in which:

Fig. 1 is a vertical sectional view through an automatic pressure differential responsive valve for maintaining a substantially uniform rate of flow in a pipeline; and Fig. 2 is a diagrammatic view illustrating two valves similar to that shown in Fig. 1, connected in parallel to function as a liquid proportioning apparatus.

Referring now to Fig. 1, the rate of flow control valve is generally identified by the numeral 1 and comprises a body 2 having an inlet passage 3 leading to an inlet chamber 3a, the inlet passage 3 being threaded for connection to a pipe section 4 comprising part of a pipeline 5. The body 2 has an outlet chamber 6a with a threaded outlet opening 6 to which another section 7 of the pipeline 5 is connected. A partition 8 extends from the inlet opening 3 and has an inverted seat 9 mounted thereon. A cover 10 has a lower flange 11 secured to the valve body 2 by a plurality of studs 12 and nuts 13 mounted upon said studs; an annular gasket 14 being interposed between the adjacent faces of the body 2 and cover 10 to form a fluid-tight seal therebetween. The cover 10 has a flange 15 at its upper end and a flexible diaphragm 16 overlies said flange. A housing 17, comprising part of a differential pressure operated control for the valve 1, has a flange 18 at its lower end which engages the diaphragm 16. A plurality of studs 19 is mounted in the flange 15 and extends through suitable openings in the flange 18 so that when nuts 20 are applied to the studs 19, the housing 17 is secured to the cover 10 with the diaphragm 16 interposed therebetween.

The cover 10 has a transverse wall 21 in which a valve stem 22 is slidably mounted. A yoke 25 is formed integral with the stem 22 and surrounds the inner end of the partition 8. The yoke 25 has a threaded opening 26 in which the upper end of a stem part or guide 27 is mounted. The guide 27 has a lower end of the same diameter as the stem 22 and is recessed at its upper end to receive a valve disc 28 cooperable with the seat 9 to control the flow between the inlet opening 3 and the outlet opening 6 of the valve 1. The lower end of the guide 27 is slidably mounted in a passage 29 formed in a plug 30 mounted in a threaded opening 31 in the valve body 2. A gasket 32 is disposed between the valve body 2 and the head of the plug 30 to form a seal.

The valve stem 22 has a shoulder 33 which is disposed above the transverse wall 21 and is adapted to form an abutment for a diaphragm-supporting plate 34 mounted upon said stem at the lower side of the diaphragm 16. A somewhat similar plate 35 is mounted upon the stem 22 above the diaphragm 16 and a nut 36 is mounted upon the upper threaded end 37 of the stem 22 to maintain the diaphragm-supporting washers 34 and 35, and the diaphragm 16 in assembled relation with said valve stem.

The cover member 10 is recessed to provide a pressure chamber 39 at the lower side of the diaphragm 16 and a passageway 40 is formed therein and communicates with the chamber 39. A conventional pipe nipple 41 is mounted in the outer end of the passageway 40 for a purpose which will be described later. The housing 17 has a threaded boss 42 formed thereon and a conventional pipe nipple 43 is mounted in said boss and has a pipe-T 43a connected thereto for a purpose which will also be described later. A compression spring 44 is disposed within the housing 17 and its lower end is engaged with the plate 35 and its upper end is engaged with a disc 45. The housing 17 has an upper end wall 46 provided with a threaded opening 47 in which an adjusting screw 48 is mounted. A conventional packing gland 49 is mounted in surrounding relation to the screw 48 to form a tight seal. The screw 48 projects into the housing 17 and its inner end is made conical as indicated at 50 so that it will seat in a complemental recess 51 disposed centrally in the disc 45.

The pipeline 5 includes a pipe section 52 axially aligned with the pipe section 7, the pipe sections having their adjacent ends spaced apart to receive an orifice plate 54 therebetween. The plate 54 has a flange 55 which projects into the space between the adjacent ends of the pipe sections 7 and 52 and is provided with an orifice 56. The adjacent ends of the pipe sections 7 and 52 are connected together by a split coupling 57 having sections secured together by screws 58. The details of the orifice plate 54 and the coupling 57 are disclosed and described in greater detail in my application Serial No. 305,481, filed on August 20, 1952.

The pipe section 7 has an orifice 59 drilled therein on the upstream side of the orifice plate 54 and an internally threaded boss 60 is welded thereto in alignment with said orifice. One end of a pipe nipple 61 is mounted in the boss 60 and an elbow 62 is mounted upon the other end of said pipe nipple. A close coupling 63 and a conventional union 64 connect the elbow 62 with the pipe nipple 61. Thus, the pressure in the pipe section 7 is communicated through the pipe fittings aforedescribed to the pressure chamber 39 at the lower side of the diaphragm 16. A similar orifice 65 is drilled in the pipe section 52 on the downstream side of the orifice plate 54 and a threaded boss 66 is welded to the pipe section 52 in alignment with the orifice 65. A conventional pipe fitting 67 is mounted in the boss 66 and one end of a conduit 68 is connected to said pipe fitting, the opposite end of said conduit being connected by a fitting 43b to the pipe-T 43a, previously referred to. Thus, the pressure in the pipe section 52 on the downstream side of the orifice plate 54 is communicated through the conduit 68 to the interior of the housing 17, which provides a pressure chamber 69. Hence, it will be apparent that the diaphragm 16 is subject to the differential pressure in the pipeline 5 on the opposite sides of the orifice plate 54. The force of the spring 44 acting upon the plate 35 connected with the valve stem 22, tends to urge the valve stem 22 downwardly to move the valve disc 28 away from the seat 9 to permit flow through the valve 1. The force of the spring 44 acting to open the valve 1 can be varied by adjusting the screw 48. The spring 44 thus provides a "set" force which is always present tending to open the valve 1. Obviously, the force of the spring 44 acts in conjunction with the pressure communicated to the upper side of the diaphragm 16 through the conduit 68, so that in order for the valve 1 to close, the pressure at the upstream side of the orifice plate 54 communicated to the lower side of the diaphragm 16 must produce a force which exceeds the sum of the forces produced by the pressure from the downstream side of the orifice plate 54 acting upon the upper side of the diaphragm 16 plus the "set" spring force. These differential pressures act across the diaphragm washers 34 and 35 and upon the valve stem 22 and tend to compress spring 44 causing the valve 1 to close and restrict the flow therethrough whenever the pressure at the upstream side of the orifice plate 54 tends to exceed the predetermined differential over the downstream pressure. Obviously, when this pressure is less than the combined spring pressure and the pressure on the downstream side of the orifice plate 54, the diaphragm assembly 16 will move downwardly and the valve disc 28 will be moved away from the seat 9 to increase the flow in order to maintain the desired differential and uniform rate of flow in the pipeline 5.

An equalizer line 43c has one end thereof connected to the pipe-T 43a by a fitting 43d and its opposite end is connected to the plug 30 by a fitting 43e. The purpose of the equalizer line 43c is to balance the pressures acting on the stem 22 to thereby provide for more sensitive and accurate flow control, it being recalled that the diameter of the stem 22 is equal to the diameter of the guide 27.

It will be noted that the pressure differential between the chamber surrounding yoke 25 and chamber 69 results in a force acting on stem diameter 22, tending to move the stem 22 upward. By communicating the pressure of chamber 69 through equalizer line 43c and 43e the force differential across stem 27 is equal to the force differential across stem 22 and acts in the opposite direction, the one thereby offsetting the other and removing a variable factor. It will be noted that the pressures through valve 1 and to chambers 69 and 39 may vary considerably, even though the pressure differential across orifice plate 54 remains constant.

With pressure on the upstream side of the main valve 1, it is possible to provide an orifice on either the downstream side or the upstream side of said valve which will provide a predetermined pressure differential between two selected points at a predetermined rate of flow. For illustrative purposes, the orifice plate 54 is disclosed herein on the downstream side of the main valve 1.

Let it be assumed that with an orifice of a selected size, a pressure differential of 10#/sq. in. across the orifice plate 54 will provide the desired uniform flow rate. With the orifice 54 producing a pressure differential of 10#/sq. in. in the line, at the desired flow rate, the spring 44 is adjusted so that, when the fluid pressure differential across the orifice plate 54 and diaphragm washer 35 is more than 10#/sq. in. the resulting hydraulically produced force is greater than the set pressure of the spring 44, and the valve stem 22 will be moved upwardly toward closed position or modulate to restrict or vary the flow through the valve 2, as required, in order to maintain the desired uniform flow rate.

With the pressure differential less than 10#/sq. in. the valve will open to increase the flow in a manner which will be readily apparent.

It will be understood that the size of the orifice and the adjustment of the spring 44 may be varied to provide any desired rate of flow. The pressure-responsive control will then function automatically to maintain a uniform flow rate by controlling the opening and closing of the valve as required.

While some slight leakage may occur along the valve stem 22, this is not detrimental to the operation of the valve 1 since it is designed to control rate of flow and not to shut off drip-tight. The described construction eliminates a sealing ring around the stem 22 and thereby avoids the friction drag imposed on the stem by the sealing ring. Any leakage along the stem 22 is carried through the fittings 41 and 61—64 to the pipe section 7, without any undesirable effect.

Fig. 2 diagrammatically illustrates the valve 1 and pipeline 5 connected in parallel with a similar valve 1a and a pipeline 5a, the two pipelines being arranged in parallel but interconnected by elbows 70—70a and pipe nipple 71—71a with the ends of a pipe-T 72. A pipe 73, into which both the pipelines 5 and 5a discharge through the pipe-T 72, is connected with the stem of said pipe-T. Obviously, the valve 1 will automatically function to control the rate of flow in the pipe 5 in accordance with the pressures communicated to the control means through the conduit 74, which diagrammatically represents the pipe fittings 41, 61, 62, 63 and 64 shown in Fig. 1, and the conduit 68 connected with the pipeline 5 on opposite sides of the orifice plate 54. Similarly, the valve 1a will maintain a uniform flow through the pipeline 5a in accordance with the pressure communicated to the pressure differential operated control means thereof through the conduits 74a and 68a, in accordance with pressure conditions existing on opposite sides of the orifice plate 54a.

It will be understood that different liquids will simultaneously flow through the pipes 5 and 5a at a rate determined by the valves 1 and 1a, respectively, and that the two liquids will become mixed in the pipe 73, in the ratio or proportion determined by the valves 1 and 1a. The valves 1 and 1a will automatically function to maintain the desired proportions of the two liquids constant. The equalizer lines 43c and 43x function to balance the pressure on the stems of the respective valves 1 and 1a and assure accurate proportioning. Thus, a comparatively simple and dependable liquid proportioning apparatus is provided simply by connecting two of the valves 1 in parallel. It will be understood that any number of liquids can be simultaneously controlled to flow in a desired volumetric ratio by employing a separate valve for controlling the flow of each liquid.

It will also be understood that various changes may be made in the details of construction and in the arrangement of the parts of the flow control valve disclosed herein, without departing from the principles of the invention or the scope of the annexed claims.

I claim:

1. In combination, a conduit; a valve connected in said conduit, including a valve body having an inlet chamber and an outlet chamber and a fluid pressure operable element for controlling the flow of fluid through said valve body from said inlet chamber to said outlet chamber; a pressure differential operated control including housing means, a diaphragm in said housing means, and means including a valve stem connecting said diaphragm with said fluid pressure operable element for controlling the operation thereof; flow-restricting orifice means connected in said conduit, said housing means providing superposed pressure chambers, one on each side of said diaphragm, and including means isolating said pressure chambers from direct communication with said inlet and outlet chambers; conduit means connecting said pressure chambers with said conduit on the upstream and downstream sides, respectively, of said orifice means, the pressure on the downstream side of said orifice means being communicated to the upper of said pressure chambers and acting on said diaphragm to tend to urge the valve stem in one direction; a spring in said upper pressure chamber of said housing means maintaining a set pressure effective upon one side of said diaphragm and opposing the pressure acting upon the opposite side of said diaphragm; and means for communicating the pressure on the downstream of said orifice means to the lower end of said valve stem to tend to urge the same in the opposite direction for equalizing the pressure differentials across said valve stem.

2. The combination defined in claim 1, wherein means for equalizing the pressure differentials across the valve stem includes a tube for communicating the pressure on the downstream side of the orifice means to the valve to act on the lower end of the valve stem.

3. The combination defined in claim 1, wherein the orifice means is of fixed size and maintains a predetermined rate of flow at a given pressure differential, and wherein the pressure on the downstream side of said orifice means acts in the same direction as the force of said spring.

4. A pressure-differential-operated valve comprising: a body having an inlet chamber and an outlet chamber; a valve element, and a valve stem connected therewith and operable to move said valve element from open to closed position to control flow between said inlet and outlet chambers; a housing; a diaphragm in said housing connected with the upper portion of said valve stem, said housing including a first pressure chamber on one side of said diaphragm and a second pressure chamber on the opposite side of said diaphragm, said pressure chambers being isolated from direct communication with said inlet and outlet chambers and being adapted to be connected to pressure zones of different magnitude; yieldable means in said first pressure chamber exerting a force of a set value on said diaphragm, acting in the same direction as the pressure in said first pressure chamber to tend to open said valve; and a conduit provided externally of said housing leading from said first pressure chamber to means at the lower end portion of said valve stem for equalizing pressure differentials across said valve stem.

5. A pressure differential operated valve, comprising: a hollow body divided into two compartments by a transverse wall, said body having in one compartment an inlet chamber and an outlet chamber; a valve closure in said one compartment operable to control flow between said inlet and outlet chambers; a stem connected with said valve closure and having one end portion thereof slidably mounted in said transverse wall and extending into the other of said compartments, said outlet chamber having guide means slidably receiving the other end portion of said stem and co-operating with said transverse wall in guiding said valve closure, the portions of said stem slidably mounted in said transverse wall and in said guide means being of substantially the same diameter; a diaphragm in the other of said compartments connected with the portion of said stem extending thereinto, said diaphragm dividing said other compartment into a first pressure chamber and a second pressure chamber, said pressure chambers being adapted to be connected to pressure zones of different magnitude; yieldable means in said first pressure chamber exerting a pressure of set value on said diaphragm; and conduit means arranged externally of said valve for applying the same pressure as exists in said first pressure chamber to said guide means to act on the end portion of said stem guided thereby for equalizing pressure differentials across said stem.

References Cited in the file of this patent

UNITED STATES PATENTS

| | | |
|---|---|---|
| 1,699,676 | Rush | Jan. 22, 1929 |
| 1,715,801 | Turner | June 4, 1929 |
| 1,787,686 | Kerr | Jan. 6, 1931 |
| 1,860,516 | Thomas et al. | May 31, 1932 |
| 2,091,051 | Mesinger | Aug. 24, 1937 |
| 2,169,175 | Ziebolz et al. | Aug. 8, 1939 |
| 2,230,718 | Gannestad | Feb. 4, 1941 |
| 2,416,860 | Waldie | Mar. 4, 1947 |